(12) United States Patent
Kennedy

(10) Patent No.: US 10,981,676 B2
(45) Date of Patent: Apr. 20, 2021

(54) ROTORCRAFT INSPECTION SYSTEMS AND METHODS

(71) Applicant: The Boeing Company, Chicago, IL (US)

(72) Inventor: James C. Kennedy, Summerville, SC (US)

(73) Assignee: The Boeing Company, Chicago, IL (US)

( * ) Notice: Subject to any disclaimer, the term of this patent is extended or adjusted under 35 U.S.C. 154(b) by 364 days.

(21) Appl. No.: 15/725,042

(22) Filed: Oct. 4, 2017

(65) Prior Publication Data

US 2019/0100336 A1 Apr. 4, 2019

(51) Int. Cl.
| | |
|---|---|
| *B64F 5/60* | (2017.01) |
| *B64C 27/08* | (2006.01) |
| *B64C 39/02* | (2006.01) |
| *B64C 13/04* | (2006.01) |
| *B64D 31/14* | (2006.01) |
| *B64D 31/04* | (2006.01) |
| *B64C 13/50* | (2006.01) |

(52) U.S. Cl.
CPC ............... *B64F 5/60* (2017.01); *B64C 27/08* (2013.01); *B64C 39/024* (2013.01); *B64C 13/04* (2013.01); *B64C 13/50* (2013.01); *B64C 2201/027* (2013.01); *B64C 2201/108* (2013.01); *B64C 2201/12* (2013.01); *B64C 2201/123* (2013.01); *B64C 2201/127* (2013.01); *B64D 31/04* (2013.01); *B64D 31/14* (2013.01)

(58) Field of Classification Search
CPC ......... B64F 5/60; B64C 39/024; B64C 27/08; B64C 2201/108; B64C 2201/127; B64C 2201/123; B64C 2201/027; B64C 2201/12; B64C 13/50; B64C 13/04; B64D 31/04; B64D 31/14
See application file for complete search history.

(56) References Cited

U.S. PATENT DOCUMENTS

| | | | |
|---|---|---|---|
| 2014/0305217 A1* | 10/2014 | Tapia ................. | G01N 27/9013 73/618 |
| 2014/0375309 A1* | 12/2014 | Graebner .............. | G01N 27/90 324/240 |
| 2016/0041628 A1* | 2/2016 | Verma .................... | G06F 3/017 345/156 |
| 2016/0334301 A1* | 11/2016 | Hafenrichter ....... | G01M 5/0075 |
| 2017/0066530 A1* | 3/2017 | Salzmann ............. | G05D 1/101 |
| 2017/0225804 A1* | 8/2017 | Hafenrichter ............ | B64F 5/60 |
| 2017/0248967 A1* | 8/2017 | Krogh .................... | G01C 5/005 |
| 2018/0035606 A1* | 2/2018 | Burdoucci ........... | A01D 34/008 |
| 2018/0120196 A1* | 5/2018 | Georgeson .............. | B64D 1/02 |
| 2018/0300871 A1* | 10/2018 | Wu ........................ | G07C 5/008 |
| 2019/0084670 A1* | 3/2019 | Sharma ................. | B64C 39/024 |
| 2019/0314990 A1* | 10/2019 | Sugaki ....................... | B25J 5/00 |

* cited by examiner

*Primary Examiner* — Mohammad K Islam
(74) *Attorney, Agent, or Firm* — Haynes and Boone, LLP

(57) ABSTRACT

Systems and methods according to one or more embodiments are provided for performing rotorcraft based non-destructive physical inspection and/or testing. In one example, a system includes a rotorcraft and a rotating arm coupled to the rotorcraft. An inspection sensor is coupled to a first end of the rotating arm and configured to be placed in close proximity to and/or in physical contact with a surface of an object.

20 Claims, 6 Drawing Sheets

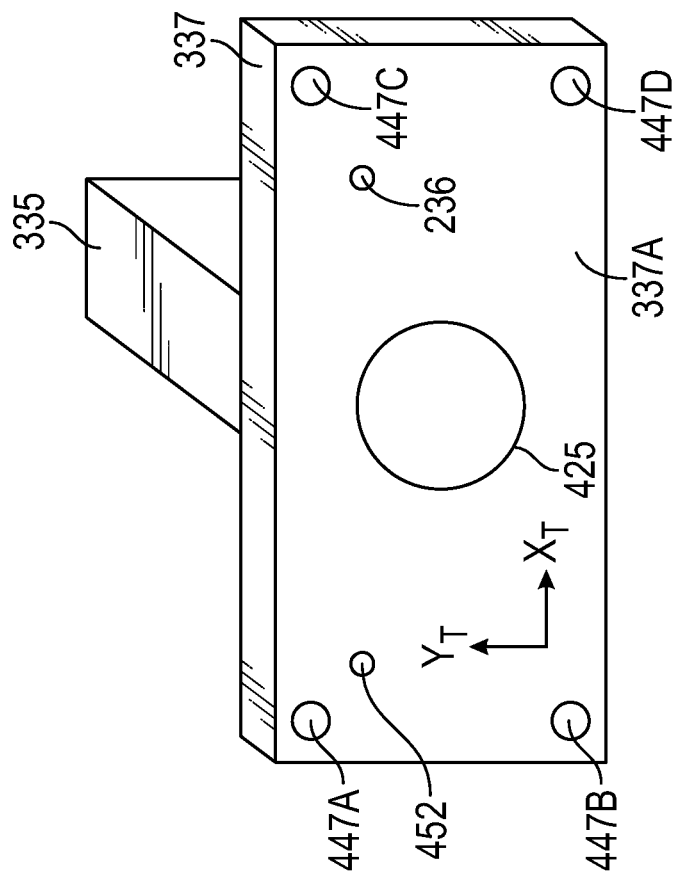
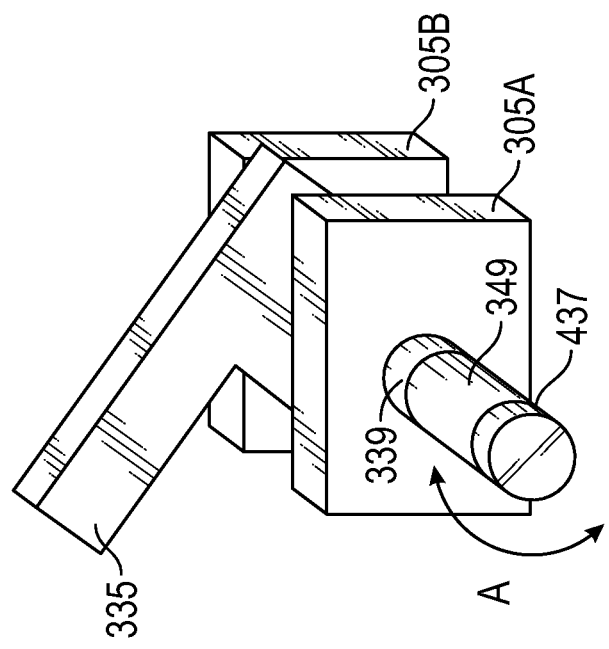
FIG. 4B
FIG. 4A

ROTORCRAFT INSPECTION SYSTEMS AND METHODS

TECHNICAL FIELD

One or more embodiments relate generally to physical inspection systems, and more particularly, for example, to a rotorcraft used for non-destructive physical inspection.

BACKGROUND

In the field of physical inspection systems, there is an ongoing effort to improve access to structures such as to perform non-destructive physical inspections. Limited access to confined spaces such as interior portions of an aircraft fuselage during production and assembly, for example, may make inspection of internal aircraft structures difficult for inspection personnel. Moreover, manual inspection of outer structures such as an aircraft wing may require elevated open framework catwalks to provide access for inspection personnel and equipment. Significantly, for inspection of in-service aircraft, there may be no ready access to upper portions of a fuselage exterior. The aircraft may need to be taken out of service and moved into a hanger for inspection. Thus, there is a need for an improved methodology to safely and efficiently inspect objects such as aircraft.

SUMMARY

Systems and methods are disclosed herein in accordance with one or more embodiments that provide for an improved approach to physically inspect structures within confined spaces and/or that do not provide ready access for inspection personnel. In various embodiments, a rotorcraft is implemented with an inspection sensor coupled to the rotorcraft. In one example, the rotorcraft is configured to transport the inspection sensor to a structure to be inspected. Moreover, the rotorcraft positions the inspection sensor in physical contact with the structure so that a non-destructive physical inspection may be performed.

In one embodiment, a system includes a rotorcraft; a rotating arm coupled to the rotorcraft; and an inspection sensor coupled to a first end of the rotating arm and configured to be placed in close proximity to and/or in physical contact with a surface of an object.

In another embodiment, a method includes positioning a rotorcraft in proximity to an object; rotating a rotating arm to place an inspection sensor in close proximity to and/or in physical contact with a surface of the object; and maintaining the inspection sensor in close proximity to and/or in physical contact with the surface of the object.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 4A-B illustrate isometric views of rotating arm components in accordance with one or more embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Systems and methods are provided in accordance with one or more embodiments that provides for a rotorcraft including an inspection sensor for performing physical non-destructive inspection of various types structures and/or structural components. The rotorcraft inspection system is particularly adapted for structures that include confined spaces and/or are not suitable for ready manual inspection, such as, for example, aircraft and bridges.

Figure 1:
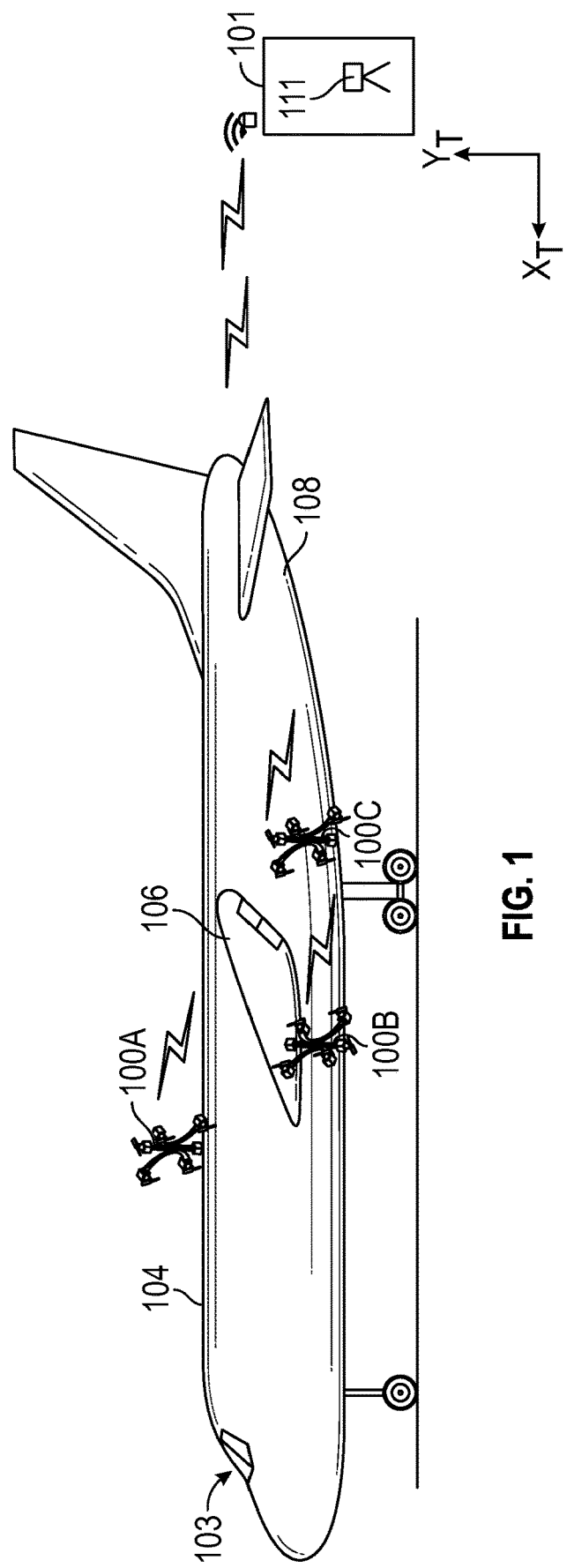
FIG. 1 illustrates a diagram of an aircraft including multiple rotorcraft inspection systems in accordance with an embodiment of the disclosure.

FIG. 1 illustrates a diagram of an aircraft 103 including multiple rotorcraft inspection systems 100A-C in accordance with an embodiment of the disclosure. As shown in FIG. 1, rotorcraft inspection systems 100A-C are performing non-destructive physical inspection of aircraft 103. For example, inspection system 100A is in physical contact with, and inspecting an upper portion exterior surface of a fuselage 104. Inspection system 100A is moving in a plane $Y_T$ along the exterior surface of fuselage 104. Inspection system 100B is inspecting an exterior surface of wing 106. In some embodiments, inspection system 100B is in physical contact with wing 106 and is stationary at an underside of wing 106. In some embodiments, inspection system 100C is inspecting an interior surface 108 of fuselage 104 and is moving in a plane $X_T$ along the interior surface of fuselage 104. In this regard, inspection system 100 provides for convenient, safe access to areas in and around large scale structures (e.g. such as aircraft 103) for use in mobile and stationary inspection environments. It will be understood that inspection of aircraft structures is presented as one non-limiting embodiment of inspection system 100, and other non-limiting embodiments are possible, such as inspection of bridge structures, for example.

In some embodiments, inspection systems 100A-C are in communication with a base station 101. In some embodiments, base station 101 wirelessly communicates with inspection system 100 to provide operating instructions to and receive data from inspection system 100, as discussed herein. Wireless communication is implemented as a secure wireless local area network (WLAN) component based on the IEEE 802.11 standards, a wireless broadband component, or various other types of wireless communication components including radio frequency (RF), microwave frequency (MWF), and/or infrared frequency (IRF) components adapted for communication with inspection system 100.

Figure 2:
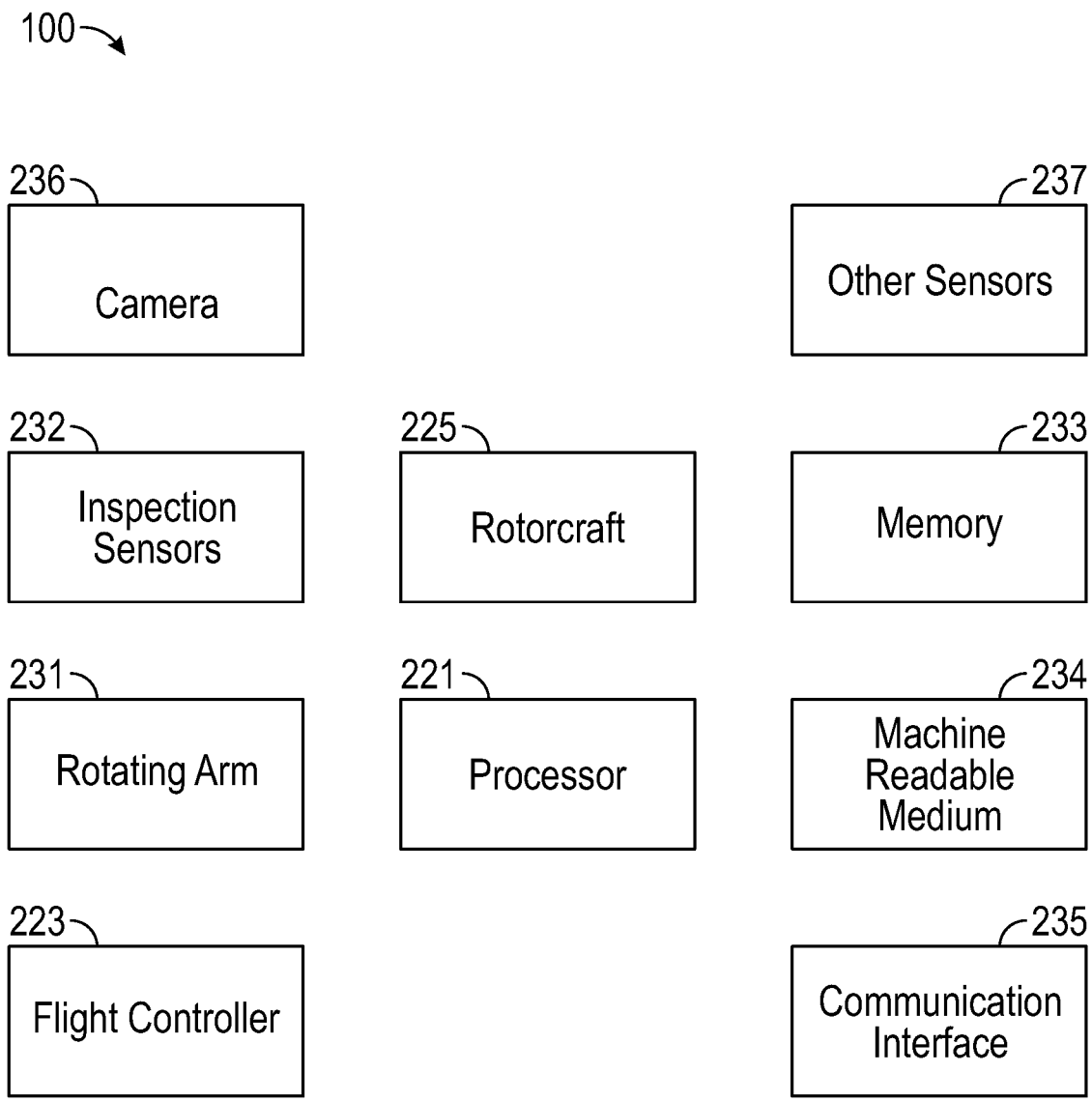
FIG. 2 illustrates a block diagram of a rotorcraft inspection system in accordance with an embodiment of the disclosure.

FIG. 2 illustrates a block diagram of a rotorcraft inspection system 100 in accordance with an embodiment of the disclosure. In some embodiments, inspection system 100 is utilized to provide non-destructive physical inspection of structures in areas that are either inconvenient to readily inspect or within a confined area that where manual physical inspection is difficult. In some embodiments inspection system 100 is utilized for non-destructive physical testing to evaluate the properties of a material, component or a system. In one embodiment, inspection system 100 includes a processor 221, a flight controller 223, a rotorcraft 225, a rotating arm 231, and an inspection sensor 232. In various embodiments, rotorcraft 225 transports inspection sensor 232 and rotating arm 231 to a structure for inspection. In some embodiments, rotorcraft 225 is implemented as an unmanned aerial vehicle. In some embodiments, rotorcraft 225 is implemented with four rotors, such as a drone, for example. In other embodiments, rotorcraft 225 is implemented with a single rotor, such as a helicopter, for example. However, other embodiments are possible, such as rotorcraft 225 implemented with fewer or more rotors.

Processor 221 includes, for example, a microprocessor, a single-core processor, a multi-core processor, a microcontroller, an application-specific integrated circuit (ASIC), a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein. Processor 221 is adapted to interface and communicate with flight controller 223, inspection sensor 232, and other sensors 237 to perform method and processing steps as described herein. In this regard, processor 221 communicates with inspection sensor 232 and other sensors 237 to receive sensor data for processing. In some embodiments, processor 221 communicates with base station 101 to provide processed sensor data to be displayed on a display 111 for a user to view. In other embodiments, processor 221 communicates with flight controller 223 to communicate orientation and/or position information of inspection system 100 and to provide instructions to navigate inspection system 100.

In various embodiments, it should be appreciated that processing operations and/or instructions are integrated in software and/or hardware as part of processor 221, or code (e.g., software or configuration data) which is stored in memory 233. Embodiments of processing operations and/or instructions disclosed herein are stored by a machine readable medium 234 in a non-transitory manner (e.g., a memory, a hard drive, a compact disk, a digital video disk, or a flash memory) to be executed by a computer (e.g., logic or processor-based system) to perform various methods disclosed herein. In one or more embodiments, the machine readable medium 234 is included as part of processor 221.

Memory 233 includes, in one embodiment, one or more memory devices (e.g., one or more memories) to store data and information. The one or more memory devices includes various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processor 221 is adapted to execute software stored in memory 233 to perform various methods, processes, and operations in a manner as described herein. In various embodiments, memory 233 stores sensor data, such as sensor data received from inspection sensor 232, and other sensors 237. In some embodiments, memory 233 stores processed sensor data received from processor 221.

Communication interface 235 includes wired or wireless communication buses. In some embodiments, communication interface provides a wireless communication interface 235 between processor 221, flight controller 223, memory 233, rotorcraft 225, inspection sensor 232, camera 236, and other sensors 237 within inspection system 100. In some embodiments, communication interface 235 is a wireless receiver configured to receive wireless signals from base station 101, for example, and communicate received signals to the various components of inspection system 100. In some embodiments, a wireless communication interface 235 is implemented as a secure wireless local area network (WLAN) component based on the IEEE 802.11 standards, a wireless broadband component, wireless Bluetooth signals, or various other types of wireless communication components including radio frequency (RF), microwave frequency (MWF), and/or infrared frequency (IRF) components adapted for communication with a network. In some embodiments, communication interface 235 includes a wired communication interface to provide wired communications between components within rotorcraft 225. A wired communication interface 235 is implemented as an Ethernet connection, or other wired communication interface 235 data bus connections.

In some embodiments, movement of rotorcraft 225 (e.g., such as propellers, for example) is controlled according to instructions provided by flight controller 223. Flight controller 223 includes, for example, a single-core or multi-core processor or microprocessor, a microcontroller, a logic device, a signal processing device, memory for storing executable instructions (e.g., software, firmware, or other instructions), and/or any elements to perform any of the various operations described herein. In various examples, flight controller 223 and/or its associated operations can be implemented as a single device or multiple devices (e.g., communicatively linked through wired or wireless connections) to collectively constitute the flight controller 223.

Flight controller 223 interfaces with memory 233 to store data and information. In certain examples, flight controller 223 is adapted to execute instructions stored within memory 233 to perform various methods and processes described herein, including implementation and execution of control algorithms responsive to sensor and/or operator inputs. Communication interface 235 is communicatively coupled to flight controller 223 so that signals received by communication interface 235 (e.g., from base station 101, for example) are provided to flight controller 223. Flight controller 223 then provides instructions to other parts of rotorcraft 225 responsive to the signals received to move rotorcraft 225 between base station 101 and a structural surface (e.g. or other object) for non-destructive inspection and/or testing. In some embodiments, the structural surface includes one or more contoured surfaces, such as contoured surfaces of aircraft 103, for example.

In some embodiments, flight controller 223 is separate from rotorcraft 225 (e.g., does not move with rotorcraft 225). In some embodiments, flight controller 223 is a portable controller such as a handheld controller that an operator of inspection system 100 provides instructions to rotorcraft 225. In other embodiments, flight controller 223 is a handheld electronic device (e.g., smartphone, wearable electronic device, personal data assistant, and/or other such device), a fixed and/or portable computer, and/or a control station (e.g., a station located within, for example, base station 101 that controls one or more rotorcraft). While certain examples of flight controller 223 receive inputs from a user that is used to pilot rotorcraft 225 and communicate signals indicative of such inputs to communication interface 235, other examples of the flight controller 223 can automatically provide instructions to rotorcraft 225 without user inputs. Additionally, it is appreciated that certain examples of rotorcraft 225 does not include a flight controller 223 and, in such examples, rotorcraft 225 can be controlled by processor 221 (e.g., from preloaded instructions stored by processor 221 in memory 233). Other examples control rotorcraft 225 through a combination of instructions from processor 221 and flight controller 223.

In some embodiments, rotorcraft 225 includes four propeller assemblies (e.g., such as propeller assemblies 303 of FIG. 3). Rotorcraft 225 includes rotating arm 231 rotatably hinged at an outer body of rotorcraft 225. In some embodiments, rotating arm 231 is free to rotate about an angle zero to three hundred sixty degrees parallel to a plane of rotorcraft 225. In some embodiments, rotating arm 231 maintains inspection sensor 232 in close proximity to and/or in physical contact with the surface of the object or structural member while rotorcraft 225 is stationary and/or moves along in proximity to the structural member and/or the object under inspection. In some embodiments, rotating arm 231 creates a conformal mount to a curved wall of fuselage 104, for example. Inspection sensor 232 is pressed toward curved wall of fuselage 104 or slightly offset while rotorcraft 225 maintains stable flight either stationary at or moving along in proximity of fuselage 104, for example.

In some embodiments, inspection sensor 232 includes one or more sensors to perform non-destructive inspection and/or non-destructive testing of structural members or objects, such as exterior surface of a fuselage 104, exterior surface of wing 106 and/or interior surface 108 of fuselage 104, for example. Inspection sensor 232 includes at least one of an ultrasonic sensor, an eddy current sensor, and a digital x-ray sensor to perform non-destructive inspection and/or non-destructive testing of structural members or objects. However, inspection sensor 232 may include other types of sensors for use in non-destructive inspection and/or non-destructive testing.

In some embodiments, inspection system 100 includes a camera 236. Camera 236 is implemented as a video camera on rotorcraft 225 to generate video images and image frames of the surface of a structural member and/or object under non-destructive physical inspection. In some, embodiments, camera 236 is coupled to rotating arm 231 to generate video images of the surface of the structural member and/or the object at a point proximate to inspection sensor 232. In other embodiments, camera 236 is coupled to rotorcraft 225 in proximity to rotating arm 231 to generate images of the surface of the structural member and/or the object under inspection. Camera 236 is in wireless communication with processor 221 and/or flight controller 223 via communication interface 235 to receive commands to perform image capture and transmit image data to processor and/or flight controller 223. In various embodiments, image data is processed by processor 221 and processed image data is transmitted via communication interface 235 to base station 101 for viewing by a user on display 111. In some embodiments, camera 236 is used for viewing and guidance of rotorcraft 225 while traveling to and from base station 101. Camera 236 is also used to accurately locate and orient inspection system 100 to an inspection area.

Other sensors 237 include alternative or additional components. For example, inspection system 100 includes one or more sensors 237 such as an orientation and/or a position sensor 237A to sense an orientation and/or a position of rotating arm 231 relative to a surface of the structural member being inspected. In some embodiments, inspection system 100 includes a pressure sensor 237B configured to measure a force applied to the inspection sensor normal to the surface of the structural member being inspected. In some embodiments, other sensors include a global positioning sensor (GPS) sensor 237C to provide position information of rotorcraft 225. In other embodiments, other sensors 237 include compasses, environmental sensors, air pressure sensors, altimeters, gyroscopes, accelerometers, and/or other such components. Sensors 237 provide data to the flight controller 223 and/or are used to help control inspection system 100.

Figure 3A:
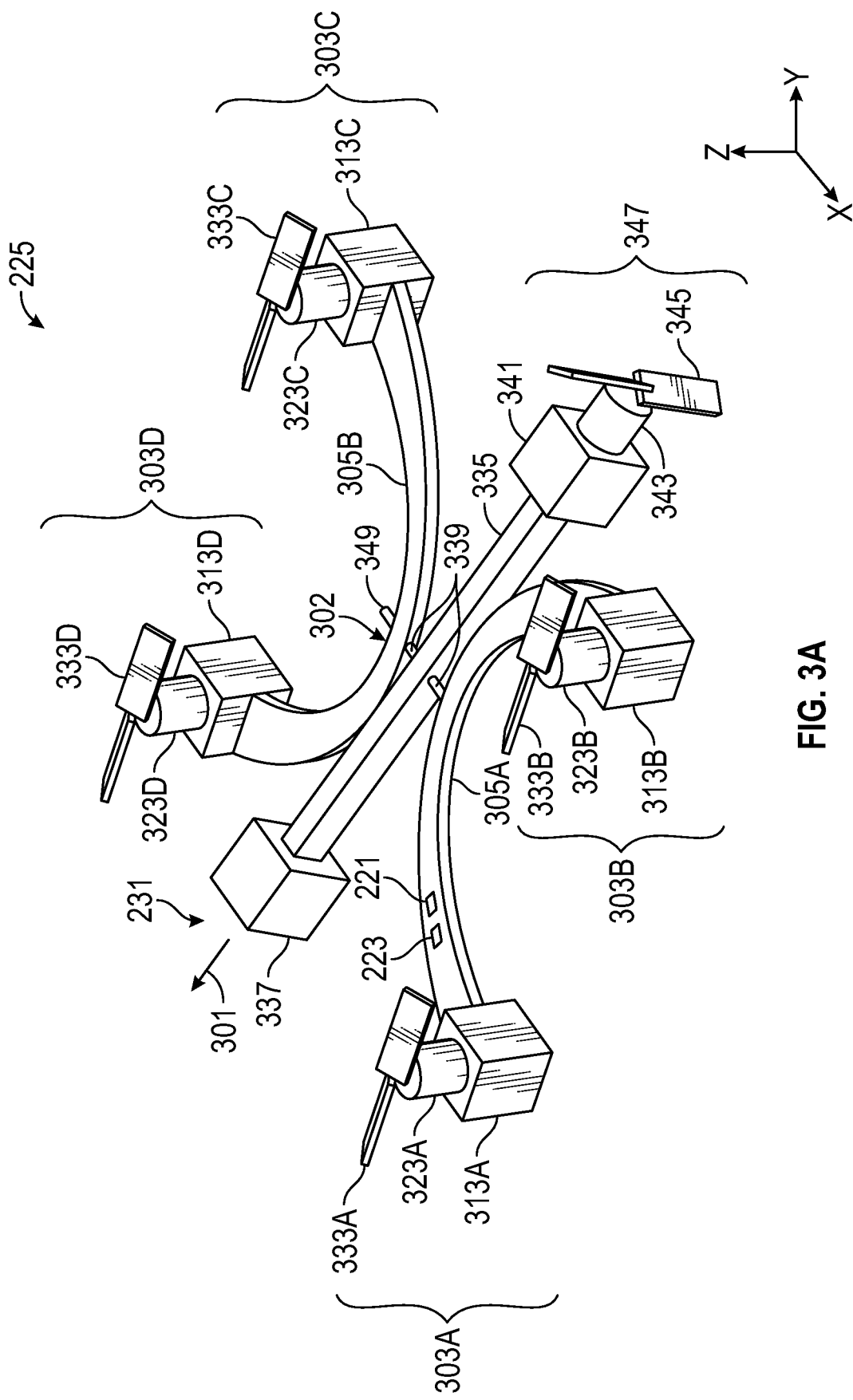
FIGS. 3A-B illustrate isometric views of a rotorcraft inspection system in accordance with one or more embodiments of the disclosure.
Figure 3B:
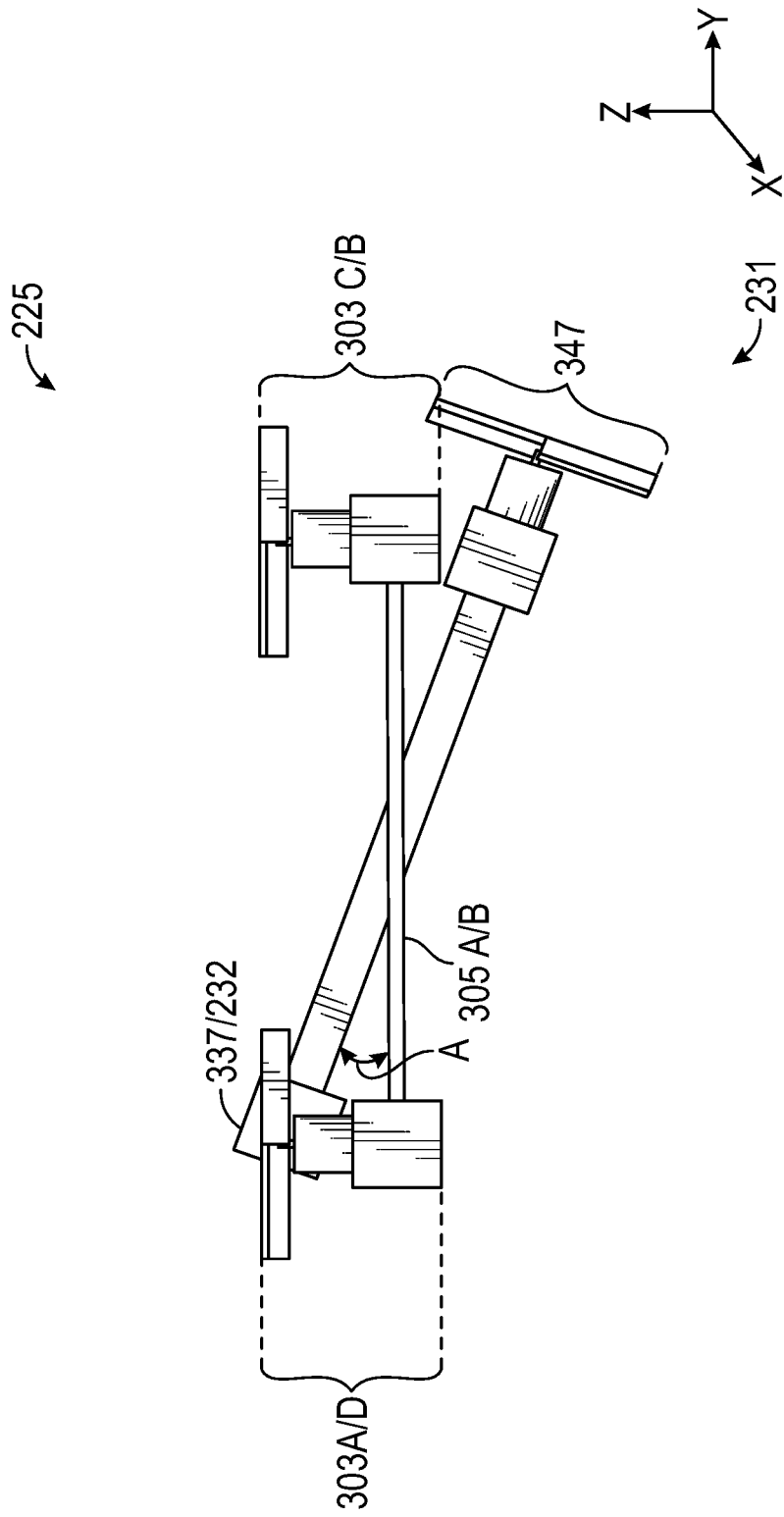

FIGS. 3A-B illustrate isometric views of a rotorcraft inspection system 100 in accordance with one or more embodiments of the disclosure. FIGS. 3A and 3B illustrate rotorcraft 225 including features of inspection system 100. Rotorcraft 225 provides for a versatile platform to position and move a payload, such as inspection sensor 232, for purposes of performing non-destructive physical inspections and/or testing.

Referring to FIG. 3A, in some embodiments, rotorcraft 225 includes propeller assemblies 303A-D, structural members 305A-B, rotating arm 231, and flight controller 223. Propeller assemblies 303A-B are coupled to respective structural member 305A and propeller assemblies 303C-D are coupled to respective structural member 305B. In some embodiments, structural members 305 are curved and made from any sort of plastic, composite, metal, wood, and/or any other sort of suitable material. In other embodiments, structural members 305 are made from substantially straight or formed tubular metal, plastic, and/or composite materials.

Propeller assembly 303 includes an engine 313 (e.g., such as 313A-D of FIG. 3A), a drive shaft 323 (e.g., such as 323A-D of FIG. 3A), and a propeller 333 (e.g., such as 333A-D of FIG. 3A). Engine 313 powers drive shaft 323 to turn or spin propeller 333. In some embodiments, engine 313 includes one or more electrical motors that are powered by one or more batteries stored within rotorcraft 225. In other embodiments, engine 313 is an internal combustion engine. Propeller assembly 303 provides for a non-limiting embodiment of rotorcraft 225, and other propulsion techniques are possible in other embodiments, such as for example, jet engines and/or other thrust producing techniques.

In some embodiments, rotating arm 231 includes a shaft 335, a motor 349, a foot 337, and a propeller assembly 347. Rotating arm 231 is fixedly connected to a pin 339 at a central location along shaft 335. Pin 339 extends through shaft 335 and ends of pin 339 are connected to a respective structural member 305A and 305B. Pin 339 rotates freely within structural members 305A-B and parallel to a plane of rotorcraft 225. Motor 349 provides power to rotate pin 339. Motor 349 is mounted to an outer surface 302 of structural member 305 and is mechanically coupled to pin 339. In some embodiments, motor 349 includes one or more electrical motors that are powered by one or more batteries stored within rotorcraft 225. In some embodiments, foot 337 is connected at a first end of shaft 335 and inspection sensor 232 is secured to foot 337. In this regard, rotating arm 231, connected to pin 339, is rotated by motor 349 to place inspection sensor 232 in close proximity and/or in physical contact with a surface of a structural member or object to be inspected, as discussed herein.

Propeller assembly 347 is connected to a second end of shaft 335. Propeller assembly 347 includes an engine 341, a drive shaft 343, and a propeller 345. Engine 341 powers drive shaft 343 to turn or spin propeller 345. In some embodiments, engine 341 includes one or more electrical motors that are powered by one or more batteries stored within rotorcraft 225. When operating, propeller assembly 347 provides for a longitudinal force 301 along shaft 335 to push and maintain inspection sensor in close proximity to and/or in physical contact with a surface of a structural member or object to be inspected.

In some embodiments, flight controller 223 and/or processor 221 provide operational commands and/or electrical signals to control the various components of rotorcraft 225. In some embodiments, processor is mounted to structural member 305. In various embodiments, processor receives sensor data (e.g., inspection sensor 232 data, other sensors 237 data and camera 236 data) and processes sensor data. In some embodiments, processor communicates sensor data to flight controller 223 and/or base station 101.

In some embodiments, flight controller 223 is mounted to structural member 305 to control rotorcraft 225. In other embodiments, flight controller 223 is located at base station 101 to remotely control rotorcraft 225. For example, flight controller 223 controls rotorcraft 225 to move in the Z direction and travel in the X direction toward a structural member to be inspected.

In normal operation, the speed of the four propeller assemblies 303A-D are relatively adjusted by flight controller 223 to provide translation along Z and X directions and to provide for pitch, roll, and yaw of rotorcraft 225. Moving in proximity of the structural member, the speed of propeller assemblies 303A-D and propeller assembly 347 are mutually adjusted by flight controller 223 to create an additional force of translation along an axis normal to the structural member. In this regard, rotorcraft 225 places inspection sensor 232 in physical contact with structural member. Rotorcraft 225 remains in normal flight orientation with the Z axis parallel to gravity. While moving rotorcraft 225 in the X or Y direction, the speeds of propeller assemblies 303A-D and propeller assembly 347 are mutually adjusted by flight controller 223 to maintain a force of translation along an axis normal to the structural member.

Referring now to FIG. 3B, rotating arm 231 is capable of being rotated at angle A at least partially between approximately zero degrees and three hundred sixty degrees parallel to a plane of rotorcraft 225. In this regard, flight controller 223 and/or processor 221 provides electrical signals to motor 349 of rotating arm 231 to adjust an angle A to place foot 337 and inspection sensor 232 in proximity of a surface of structure or object to be inspected. The speed of propeller assemblies 303A-D and propeller assembly 347 are mutually adjusted by flight controller 223 to create an additional force of translation along an axis normal to the surface of the structure or object so that foot 337 is in physical contact with the surface.

FIGS. 4A-B illustrate isometric views of rotating arm components in accordance with one or more embodiments of the disclosure. As shown in FIG. 4A, shaft 335 of rotating arm 231 is moved through an angle A by motor 349 coupled to pin 339 (e.g., not shown). Pin 339 extends through shaft 335 and ends of pin 339 are connected to a respective structural member 305A and 305B. In some embodiments, rotorcraft 225 includes an angle sensor 437 coupled to motor 349 to measure angle A and communicate with processor 221 and/or flight controller 223 to provide shaft 335 angle information.

Referring to FIG. 4B, shaft 335 is connected to foot 337. Foot 337 forms a part of the first end of rotating arm 231 and is coupled to inspection sensor 232. In some embodiments, foot 337 includes a cavity 425 within a front face 337A of foot 337 to house inspection sensor 232. In some embodiments, inspection sensor 232 is installed within cavity 425 and configured to be in physical contact with a surface of the structure or object. In other embodiments, inspection sensor 232 is installed in cavity 425 and set back from front face 337A.

In various embodiments, foot 337 includes foot interface 447A-D. In some embodiments, foot interface 447A-D is partially embedded into face 337A, and foot interface 447A-D protrudes from face 337A to physically contact the surface of the structure or object. Interface 447A-D provides for an approximately friction free interface between foot 337 and the surface of the structure or object. In this regard, interface 447A-D may include material such as spherical ball bearings, Teflon, and/or any other suitable material that provides for a friction free interface and prevents damage.

In some embodiments, video camera 236 is installed on face 337A to provide for video images of the surface of the structure or object, as discussed herein. In some embodiments, a pressure sensor 452 is installed on face 337A and configured to measure a force applied to inspection sensor 232 normal to the surface of structure or object to be inspected.

Figure 5:
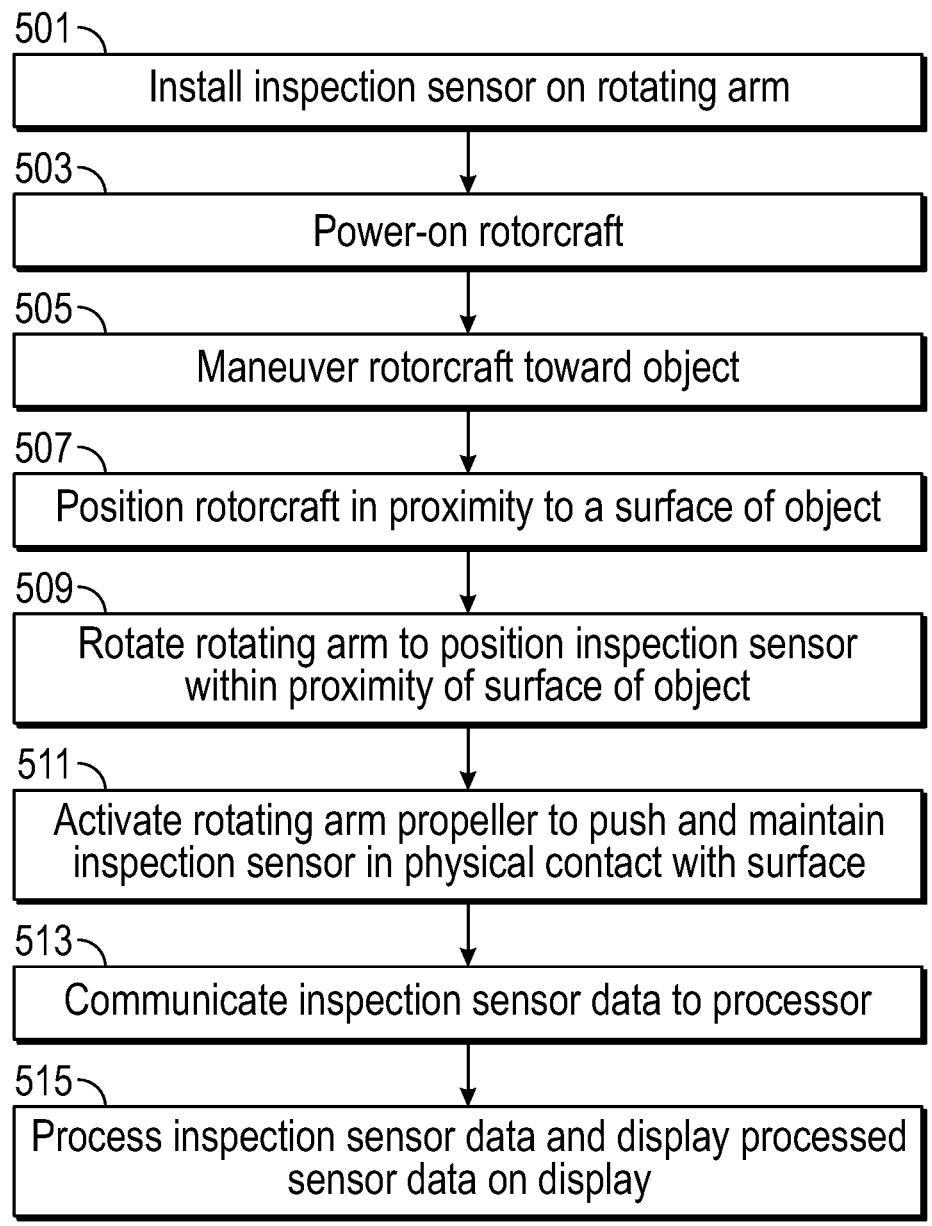
FIG. 5 illustrates a process flow for operating a rotorcraft inspection system in accordance with an embodiment of the disclosure.

FIG. 5 illustrates a process flow for operating a rotorcraft inspection system 100 in accordance with an embodiment of the disclosure.

In block 501, an operator may optionally install and/or replace an inspection sensor 232 on inspection system 100. An inspection sensor 232 is installed onto foot 337 that is coupled to a first end of a shaft 335 of rotating arm 231. For example, one or more of an ultrasonic sensor, an eddy current sensor, and a digital x-ray sensor is installed onto foot 337 to perform non-destructive inspection and/or non-destructive testing of an object to be inspected and/or tested. Other types of sensors for use in non-destructive inspection and/or non-destructive testing may also and/or alternatively be installed onto foot 337.

In block 503, power is applied to rotorcraft 225. In some embodiments, batteries stored within rotorcraft 225 may be connected to a common power bus that distributes electrical power to components of inspection system 100.

In block 505, flight control receives instructions to maneuver rotorcraft 225 toward an object to be inspected. Instructions may be communicated remotely by an operator from a base station 101 to flight controller 223 and/or executed from memory 233.

In block 507, flight controller 223 receives instructions to position rotorcraft 225 in proximity to a surface of the object to be inspected. Instructions to position rotorcraft 225 may be communicated remotely by an operator from a base station 101 to flight controller 223 and/or executed from memory 233. In some embodiments, video camera 236, installed on rotorcraft 225, generates video images of the object and provides video image data to processor 221. Processor 221 communicates the video image data to base station 101 and operator views the video images on display 111. In some embodiments, a GPS sensor 237C provides position information of rotorcraft 225 to processor 221 and processor 221 communicates GPS data to base station 101 to aid in the positioning.

In block 509, flight controller 223 and/or processor 221 receives instructions to rotate rotating arm 231 to position inspection sensor 232 within proximity of a surface of the object to be inspected. In some embodiments, an orientation sensor and/or a position sensor installed on rotating arm 231 and/or rotorcraft 225 provides orientation and/or position data of rotating arm to processor 221 for processing. In some embodiments, processor 221 communicates orientation and/or position data to base station 101 to aid in the positioning.

In block 511, flight controller 223 and/or processor 221 receives instructions to activate propeller assembly 347 connected to a second end of shaft 335 of rotating arm 231. When activated, propeller assembly 347 provides for a longitudinal force 301 along shaft 335 to push and maintain inspection sensor in close proximity to and/or in physical contact with a surface of a structural member or object to be inspected. In this regard, propeller assembly 347 working cooperatively with propeller assemblies 303A-D maintains inspection sensor 232 in close proximity to and/or in physical contact with the surface of the object being non-destructive inspected and/or tested. Inspection sensor 232 maintains close proximity to and/or physical contact with the surface while rotorcraft 225 is stationary and/or moving along in proximity to the object. Moreover, foot 337 is configured to substantially physically contact the object surface.

In block 513, inspection sensor 232 data is wirelessly communicated to processor 221 via communication interface 235.

In block 515, processor 221 optionally processes sensor data received from inspection sensor 232. In some embodiments, processor 221 is configured to store inspection sensor 232 data and processed data in memory 233. In some embodiments, processor 221 is optionally configured to communicate processed data to base station 101. Base station 101 displays processed data on display 111 for a user/operator to view.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable media. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
a rotorcraft defining a plane of the rotorcraft;
a rotating arm coupled to the rotorcraft, wherein the rotating arm is configured to rotate in a second plane along an angle formed between the rotating arm and the plane of the rotorcraft;
an inspection sensor coupled to a first end of the rotating arm and configured to be placed in proximity to and/or in physical contact with a surface of an object;
a motor configured to rotate the rotating arm along the angle at least partially between approximately zero and three hundred sixty degrees relative to the plane of the rotorcraft; and
an orientation and/or a position sensor configured to sense an orientation and/or a position of the rotating arm relative to the surface of the object.

2. The system of claim 1, further comprising a foot that forms a part of the first end of the rotating arm and coupled to the inspection sensor, wherein the foot is configured to substantially physically contact the surface of the object.

3. The system of claim 2, wherein the rotating arm maintains the sensor in proximity to and/or in physical contact with the surface of the object while the rotorcraft is stationary and/or moves along in proximity to the object.

4. The system of claim 1,
further comprising a foot that forms a part of the first end of the rotating arm and coupled to the inspection sensor, wherein the foot is configured to substantially physically contact the surface of the object.

5. The system of claim 1, further comprising a propeller assembly coupled to a second end of the rotating arm, the propeller assembly comprising a propeller and an engine connected to the propeller, and configured to maintain the inspection sensor in proximity to and/or in physical contact with the surface of the object.

6. The system of claim 5, further comprising a pressure sensor configured to measure a force applied to the inspection sensor normal to the surface of the object.

7. The system of claim 1, wherein the inspection sensor comprises at least one of an ultrasonic sensor, an eddy current sensor, or a digital x-ray sensor configured to perform non-destructive inspection and/or non-destructive testing of the object.

8. The system of claim 7, further comprising a video camera coupled to the rotating arm and configured to generate video images of the surface of the object at a point proximate to the inspection sensor.

9. The system of claim 8, further comprising a flight controller in communication with the rotorcraft and the video camera, and configured to provide instructions to the rotorcraft to move between a base station and/or in proximity to the object, wherein the object comprises one or more contoured surfaces.

10. The system of claim 1, further comprising:
a processor configured to process data received from the inspection sensor; and
a display configured to display the processed data to a user.

11. The system of claim 10, further comprising a wireless communication interface configured to wirelessly communicate between the inspection sensor and the processor.

12. A method of using the system of claim 1 comprising:
positioning the rotorcraft in proximity to the object;
rotating the rotating arm to place the inspection sensor in proximity to and/or in physical contact with the surface of the object; and maintaining the inspection sensor in proximity to and/or in physical contact with the surface of the object.

13. A method comprising:
positioning a rotorcraft in proximity to an object, wherein the rotorcraft includes a plane of the rotorcraft;
rotating a rotating arm to place an inspection sensor in proximity to and/or in physical contact with a surface of the object, wherein the rotating arm is configured to rotate in a second plane along an angle formed between the rotating arm and the plane of the rotorcraft, and wherein rotating the rotating arm further comprises rotating the rotating arm along the angle at least partially between approximately zero and three hundred sixty degrees relative to the plane of the rotorcraft;
maintaining the inspection sensor in proximity to and/or in physical contact with the surface of the object; and
sensing an orientation and/or a position of the rotating arm relative to the surface of the object.

14. The method of claim 13, further comprising coupling a foot that forms a part of a first end of the rotating arm to the inspection sensor, wherein the foot is configured to substantially physically contact the surface of the object.

15. The method of claim 14, wherein maintaining comprises maintaining the inspection sensor in proximity to and/or in physical contact with the surface of the object while the rotorcraft is stationary and/or moving along in proximity to the object.

16. The method of claim 13, wherein a foot forms a part of a first end of the rotating arm to the inspection sensor, and wherein the foot is configured to substantially physically contact the surface of the object.

17. The method of claim 13, further comprising a propeller assembly coupled to a second end of the rotating arm, the propeller assembly comprising a propeller and an engine connected to the propeller, and configured to maintain the inspection sensor in proximity to and/or in physical contact with the surface of the object.

18. The method of claim 17, further comprising measuring a force applied to the inspection sensor normal to the surface of the object, wherein the inspection sensor comprises at least one of an ultrasonic sensor, an eddy current sensor, or a digital x-ray sensor configured to perform non-destructive inspection and/or non-destructive testing of the object.

19. The method of claim 13, further comprising:
generating video images of the surface of the object at a point proximate to the inspection sensor; and
communicating with the rotorcraft to provide instructions to the rotorcraft to move between a base station and/or in proximity to the object, wherein the object comprises one or more contoured surfaces.

20. The method of claim 13, further comprising:
wirelessly communicating between the inspection sensor and a processor to provide data from the inspection sensor; and
processing data received from the inspection sensor; and displaying the processed data to a user.

* * * * *